UNITED STATES PATENT OFFICE.

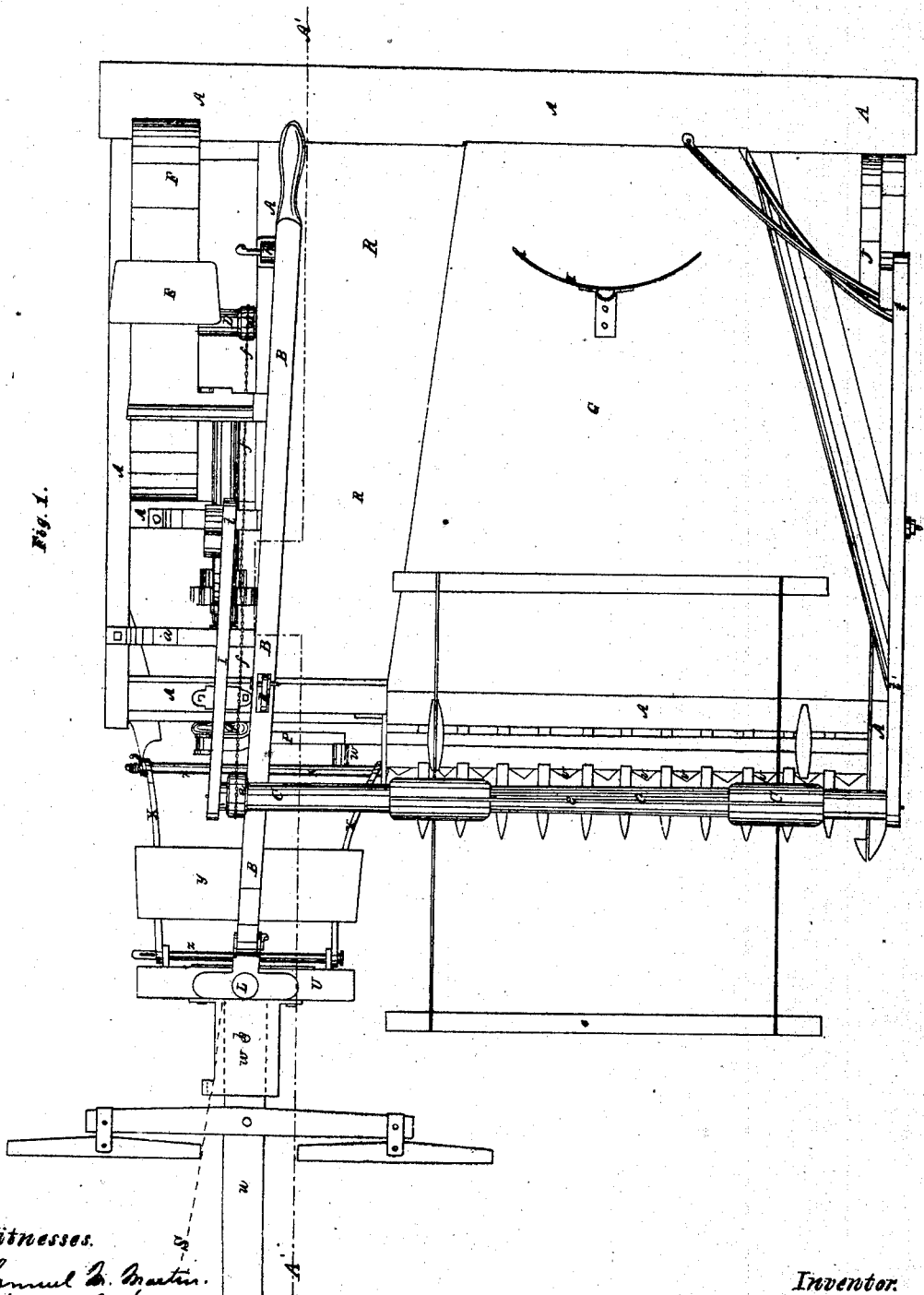

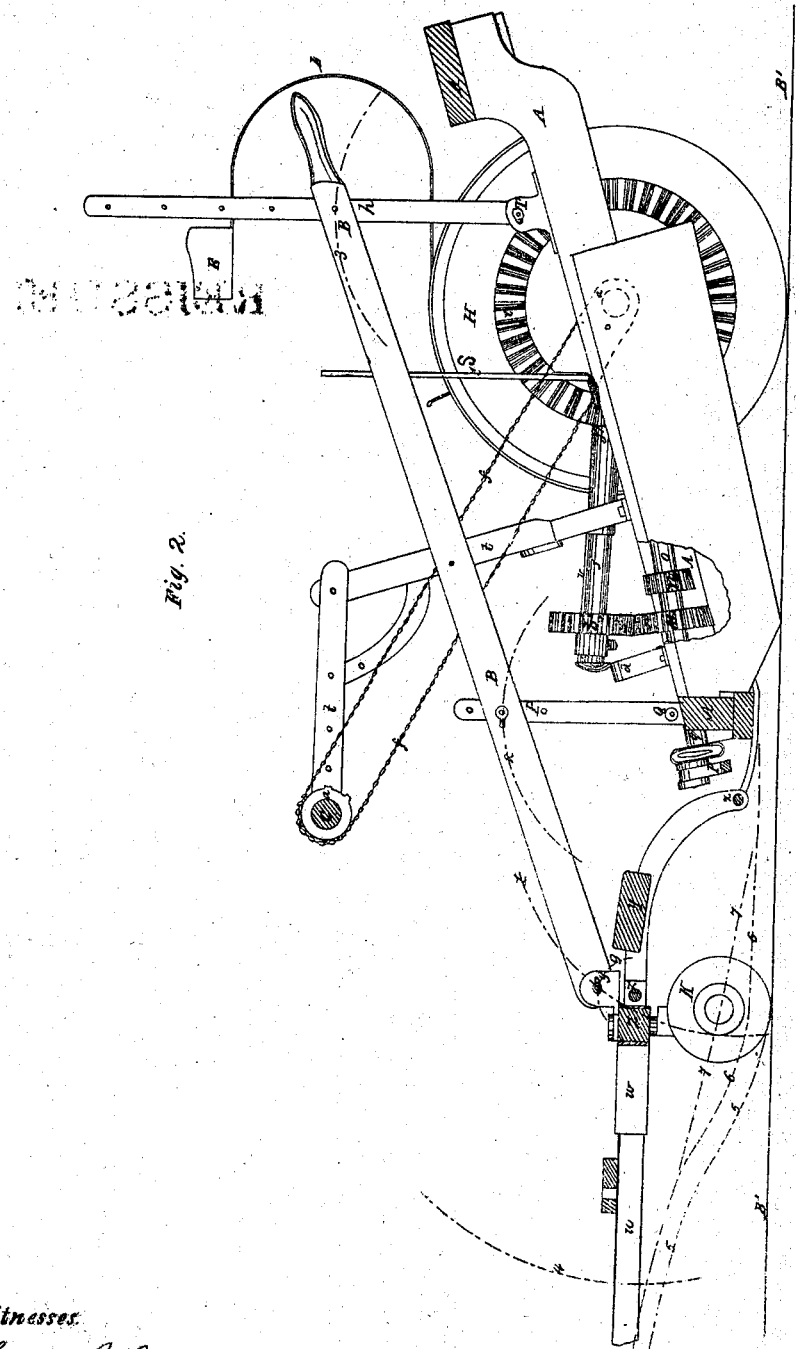

SAMUEL N. PURSE, OF ASHLEY, MISSOURI.

IMPROVEMENT IN HARVESTERS.

Specification forming part of Letters Patent No. 26,616, dated December 27, 1859.

*To all whom it may concern:*

Be it known that I, SAMUEL N. PURSE, of Ashley, in Pike county, and State of Missouri, have invented a new and useful Improvement in Harvesting-Machines; and I do hereby declare that the following is a full, clear, and exact description of the same, reference being had to the annexed drawings, making part of this specification, in which—

Figure 1 is a plan, and Fig. 2 a section, through A' A'.

The nature of my invention consists in a novel arrangement and combination of devices for changing the velocity of the knives.

To enable others skilled in the arts to make and use my invention, I will proceed to describe the construction and operation thereof.

Similar letters of reference represent corresponding parts of the different figures of the drawings aforesaid.

A A is the main frame of the machine, which is mounted upon a pair of truck-wheels. (Shown at J and H.)

Against the inside of the wheel H a cog-wheel, $i$, is fixed, which meshes in a pinion fixed upon the shaft $i$ at $j'$. This pinion is thrown in and out of gear with the wheel $i$ by means of a lever, $c$. Upon the opposite end of the shaft $j$ another pinion is fixed, which meshes in a corresponding pinion, $m$, which drives the shaft O, upon which it is fixed, and upon this shaft O a crank, $q$, is fixed, to which are connected the knives V V at W by means of the connecting-rod $p$, from whence the said knives receive their motion, which is of the ordinary reciprocating kind usually applied to harvesting-machines.

The outer end of the shaft $j$ is supported by means of a brace, (shown at $a$,) upon which a journal-box is fixed.

The shaft $j$ is set at an angle with the shaft O, and the wheel $l$ is made to move back and forth upon a feather, $r$, so that it may be adjusted to mesh in the wheels $m$ or $n$, the wheel $n$ being made smaller than the wheel $m$, whereby the velocity of the shaft O will be increased whenever the wheel $l$ is made to mesh into the wheel $n$, as will also the knives, which is the object of adjusting these wheels and shafts in the manner described.

The rest of the machine to which my invention is applied is similar to other machines in use, and need not therefore be here described.

What I claim as my invention, and desire to secure by Letters Patent, is—

The arrangement and combination of the shafts $o$ and $j$ with the driving-wheel and cutter, and the pinions $l$, $m$, and $n$, as shown, for the purpose of changing the velocity of the knives, in the manner described.

SAMUEL N. PURSE.

Witnesses:
SAMUEL M. MARTIN,
WILLIAM H. PURSE.